May 11, 1943.	C. A. ELLIS	2,318,766
AUTOMATIC HYDRAULIC-GASOLINE STORAGE TANK
Filed June 21, 1940	3 Sheets-Sheet 1
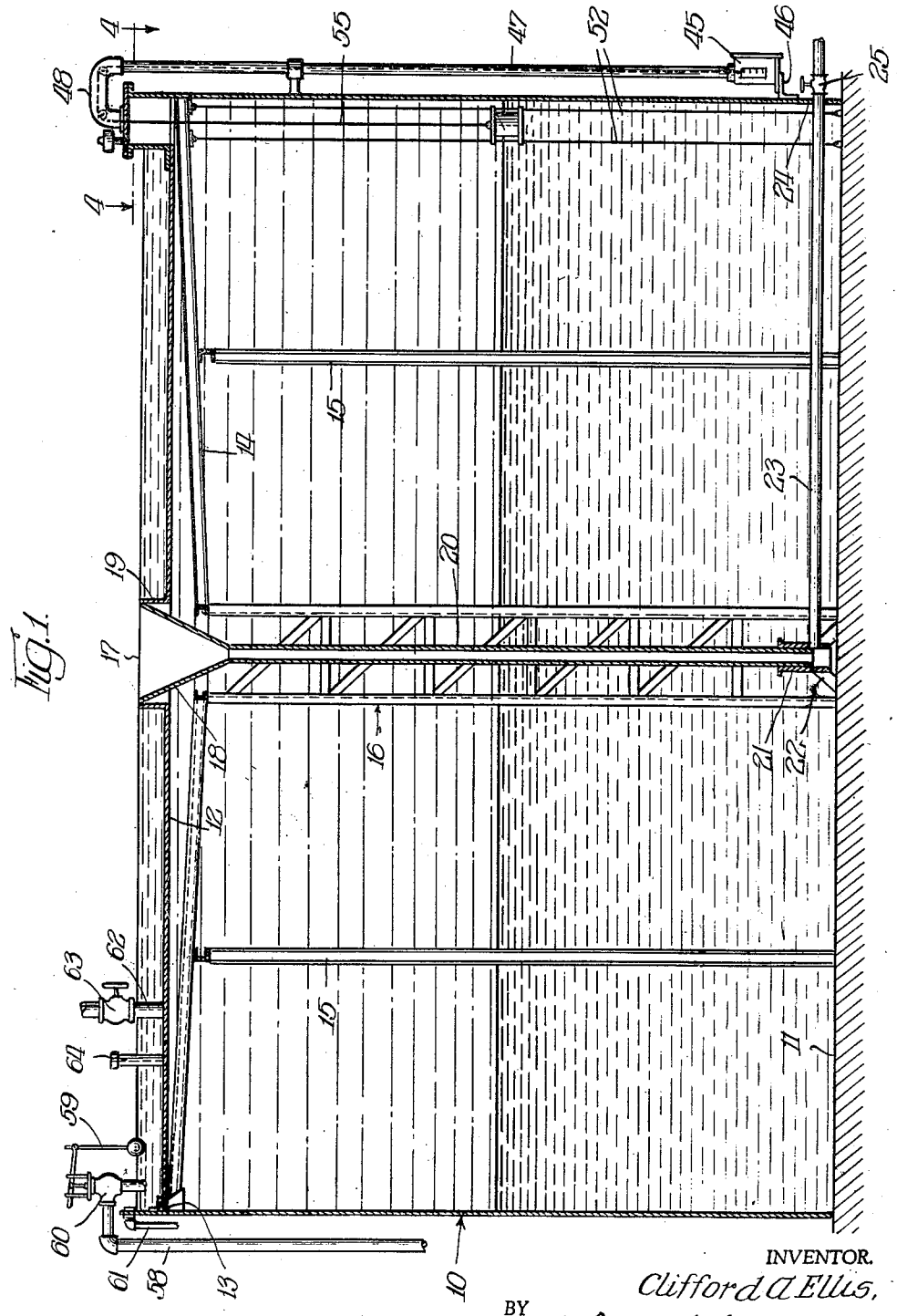
INVENTOR.
Clifford A Ellis,
BY

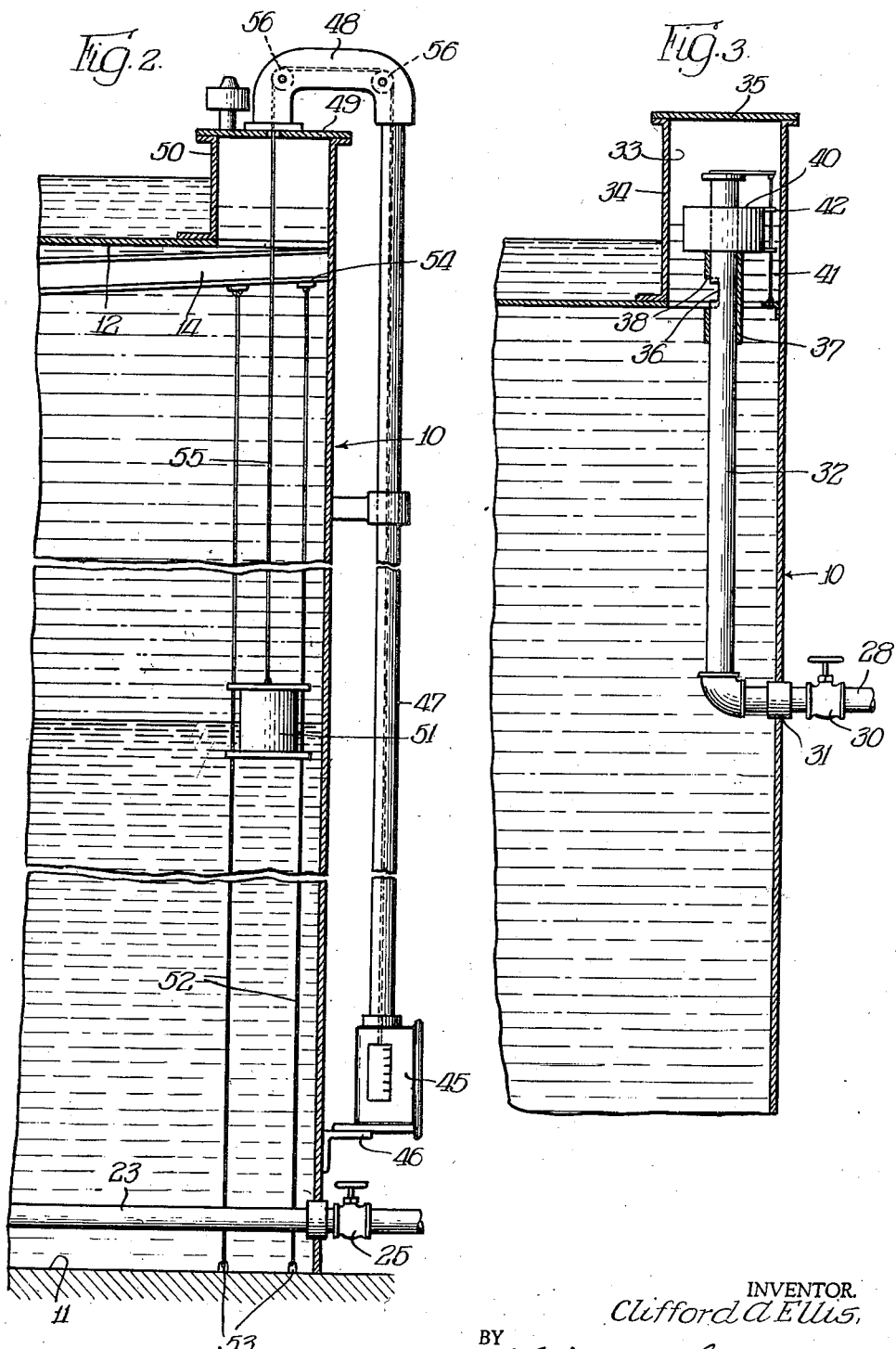

May 11, 1943.  C. A. ELLIS  2,318,766
AUTOMATIC HYDRAULIC-GASOLINE STORAGE TANK
Filed June 21, 1940  3 Sheets-Sheet 3
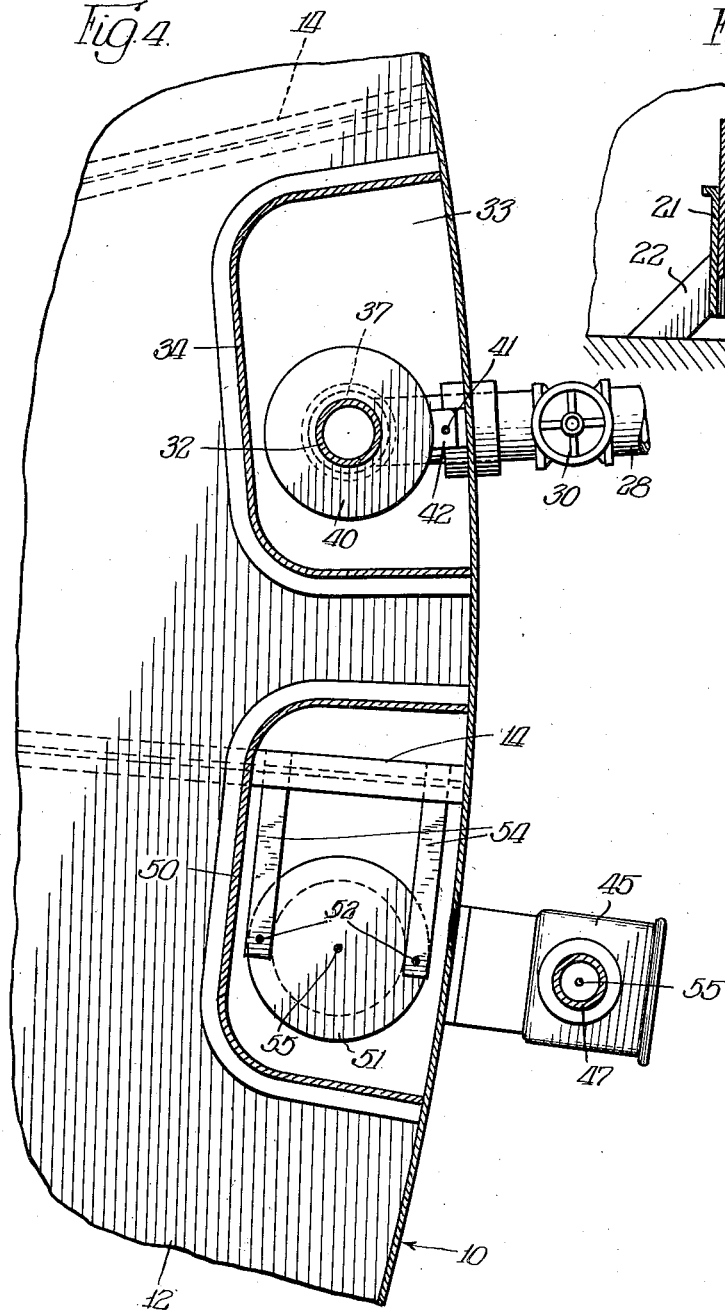
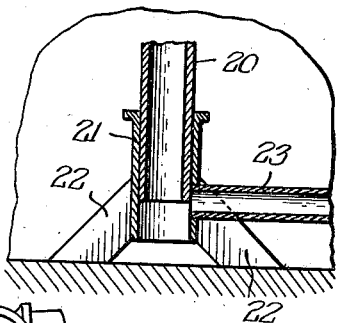
INVENTOR.
Clifford A. Ellis, Patented May 11, 1943

2,318,766

UNITED STATES PATENT OFFICE 2,318,766

AUTOMATIC HYDRAULIC GASOLINE STORAGE TANK

Clifford A. Ellis, Ridgefield, N. J., assignor to Graver Tank & Mfg. Co., Inc., Catasauqua, Pa., a corporation of Delaware Application June 21, 1940, Serial No. 341,597

5 Claims. (Cl. 221—67)

The invention relates to storage tanks and particularly to a vaporless storage tank for volatile liquids wherein the same is stored over a layer of water or other liquid of higher specific gravity than the stored liquid and with which it is not miscible.

In ordinary closed tanks the volume of space between the surface of the liquid and the roof varies inversely as the volume of the liquid in the tank. During the heat of the day evaporation of the volatile liquid causes this space to become filled with saturated vapors. As a result of daily temperature changes and the cooling which occurs during the night the vapors are caused to expand and contract whereby some are expelled to the atmosphere with fresh air being drawn into the tank upon contraction. Frequent expansions and contractions of this nature are known in the art as "breathing" and when coupled with repeated operations for filling the tank a considerable quantity of the stored liquid may be lost solely by evaporation.

It is an object of the present invention to prevent these "breathing" and other losses by providing a hydraulic-gasoline storage tank in which the volatile liquid is stored over a quantity of water so as to maintain the tank full of liquid at all times. Since the vapor space in the tank is eliminated evaporation of the volatile liquid is effectively prevented.

The present invention is an improvement over the storage tank shown in my Patent No. 1,968,673 granted July 31, 1934, wherein the liquid is stored over a layer of water or other liquid of higher specific gravity and which is not miscible. The volatile liquid is pumped into the tank and also withdrawn therefrom on a plane substantially coinciding with the tank roof and the depth of the water in the tank is maintained so that the liquid is at all times in contact with the roof, eliminating the vapor space within the tank. The roof is of the flexible or diaphragm type and its vertical movement is utilized to automatically regulate and control the flow of water into and out of the tank.

Another object is to improve the above type of storage tank by providing a float-controlled inlet and outlet for the volatile liquid which will automatically regulate the flow of the same in accordance with the flow of the water into or out of the tank, whereby the volatile liquid is maintained in contact with the roof at all times regardless of whether the tank is being filled or emptied.

Another object resides in the provision of an improved valve-controlled outlet for discharging the water from the tank and which will have actuation upon movement of the diaphragm type roof to completely shut off the flow from the tank or open the outlet to its full extent, depending on the quantity of liquid within the tank.

A further object is to provide improved means in combination with the diaphragm type roof for storing the water thereon, for flowing the water over a circular weir to replenish the liquid in the tank and which will be discharged from a centrally located depending pipe terminating adjacent the bottom of the tank so as to permit flow of the water in all directions radially of said pipe.

Another object of the invention is to provide visual means operated by float-controlled means within the tank for registering at all times the approximate quantity of water and stored liquid within the tank.

With these and various other objects in view, the invention may consist of certain novel features of construction and operation as will be more fully described and particularly pointed out in the specification, drawings and claims appended hereto.

In the drawings, which illustrate an embodiment of the inveniton, and wherein like reference characters are used to designate like parts—

Figure 1 is a vertical sectional view showing a hydraulic-gasoline storage tank embodying the improved features of the present invention;

Figure 2 is an enlarged fragmentary sectional view showing visual means for indicating the approximate quantity of water and stored liquid within the tank;

Figure 3 is an enlarged fragmentary sectional view showing the float-controlled inlet and outlet for the volatile liquid stored in the tank;

Figure 4 is a sectional view taken substantially on line 4—4 of Figure 1 and enlarged to more clearly illustrate the location of the parts disclosed; and Figure 5 is a detail sectional view showing the construction of the outlet pipe and valve for controlling the discharge of the water from the tank.

Referring to the drawings, the reference character 10 indicates a cylindrical tank having a bottom 11 and a roof 12. The roof 12 is a flexible or diaphragm type of roof suitably secured around its periphery 13 to the inside of the cylindrical tank. The roof is suitably supported in a concave position by rafters 14 extending radially outward from the center of the tank and being supported by the uprights or columns 15 and by the central supporting structure indicated in its entirety by numeral 16 located centrally of the tank. The rafters terminate short of the center of the tank, for which reason the structure 16 is required and also by terminating short of the center the rafters provide a circular opening within which is located the member 18 of funnel-shape, having connection with the upstanding flange 19 of the roof at its upper end, thereby providing a circular weir over which water from the roof may flow into the funnel member 18 to be conducted therefrom by the depending pipe 20 and delivered to the bottom of the tank. The roof is preferably fabricated of light steel plates and when not in normal position, as shown in full lines in Figure 1, the said roof is supported in concave or dished position by said rafters.

The connection between funnel member 18 and flange 19 of the roof is water-tight so that the gasoline or stored liquid within the tank will not escape therefrom. The circular weir thus provided allows the water on the roof to flow over a relatively large circumference and which is supplied to the depending pipe 20, which conducts the water to the bottom of the tank. The lower end of this pipe is guided by means of a pipe sleeve 21 shown in detail in Figure 5 and which pipe sleeve is suitably supported in spaced relation from the base 11 of the tank by angular brackets 22. The lower end of the pipe 20 fits within the pipe sleeve 21 and has telescoping movement therewith, the same being imparted to the depending pipe by movement of the diaphragm type of roof 12. An outlet pipe 23 connects with the sleeve 21 providing an outlet for withdrawing water from the tank and discharging the same to the exterior of the tank for which purpose outlet pipe 23 passes through the cylindrical wall of the tank at 24 and is equipped with a valve 25.

The depending pipe 20 has movement for completely closing off the outlet pipe 23 or opening said outlet its maximum extent. When the diaphragm type roof 12 is horizontal, which is the normal position for the roof, as shown in Figure 1, the end of depending pipe 20 will be positioned approximately half way with respect to the outlet opening provided by pipe 23. Therefore movement of pipe 20 a distance just one-half the diameter of pipe 23 will completely shut off the outlet if said movement is in a downward direction, or open said outlet its full extent if the movement is in an upward direction. The outlet for the water is accordingly controlled by movement of the roof, it being understood that the roof will flex upwardly or downwardly, depending on the pressure exerted by the liquid in the tank.

The volatile liquid to be stored in the tank is introduced and withdrawn through the pipe line 28 having the valve 30 located exteriorly of the tank and which pipe line enters the cylindrical wall of the tank as at 31 to extend upwardly by means of the upright pipe section 32 and terminate within the space formed by the enclosure 33, Figure 3. Said enclosure, as better shown in Figure 4, is formed in connection with the cylindrical wall of the tank by means of the metal member 34 bent to a special shape for the purpose, whereby a rectangular enclosure is provided extending a distance above the roof 12 of the tank and which is closed by the manhole cover 35. The tank always contains a quantity of liquid which completely fills the tank, and which requires the volatile liquid to rise within the space 33. The volatile liquid is introduced and withdrawn from this space by the upright pipe section 32 having an opening 36 located on a horizontal plane coinciding with the periphery of the roof 12. Said upper end of pipe section 32 is provided with a movable sleeve 37 likewise having an opening therein as at 38 and being adapted for movement vertically of the pipe section by means of the float 40 suitably secured to the upper end of said sleeve. The float is prevented from rotation which also prevents the sleeve from rotating on the pipe section 32 by means of the guide wire 41 suitably held in a vertical position and which passes through openings formed in the projections 42 extending outwardly from said float.

By preventing the sleeve from rotating opening 38 can be positioned in alignment with opening 36 and when the parts are thus positioned the volatile liquid may be withdrawn at the maximum rate from the tank or may be introduced at the maximum rate into the tank. It will be observed that this positioning of the sleeve with respect to opening 36 is controlled by the float 40 which in turn moves up and down with the rise and fall of the stored liquid within the tank. When the level of the liquid within space 33 falls the float will descend to a lower position and accordingly sleeve 37 will function to limit the extent of opening 36 and to completely close said opening, provided the float descends to a sufficiently low position. A similar result occurs in the event the stored liquid within space 33 should rise, causing the float to rise. In this case the lower part of sleeve 37 will close off the opening 36 and will completely shut off said opening in the event the float should rise to the top of the pipe section 32.

The present tank is provided with indicating means, Figure 2, actuated by a float member within the tank so as to visually indicate at all times the proportion of water and volatile liquid stored in the tank. The indicator 45 is supported on the exterior bracket 46 and has suitable connection with pipe 47 extending vertically from the indicator to slightly above the roof 12. By means of the elbow portion 48 the pipe can be connected to the manhole cover 49 which provides a cover for the roof opening formed by the upstanding arcuate shaped member 50, as will be better understood by reference to Figure 4. The elbow portion 48 may be readily disconnected from both the manhole cover and pipe when it is necessary to remove said cover. The numeral 51 indicates a float located within the tank and confined for vertical movement by means of the vertical guide wires 52 suitably secured to the bottom of the tank as at 53 and at their upper end to members 54 extending from a rafter 14. The cable 55 extends from the indicator 45 to the float member 51. In the elbow portion 48 the cable passes over pulleys 56. As the float moves vertically within the tank in accordance with variations in the proportion of water and volatile liquid stored within the tank the indicating means 45 is actuated and therefore it is possible for the operator to know at all times the exact contents of the storage tank.

Water is supplied to the roof 12 by the water supply line 58, Figure 1, having the float structure 59 for automatically actuating the supply valve 60. In positions of the roof below its normal position, as shown in Figure 1, water will flow over the edge of the circular weir 17 into the funnel-shaped member 18 which forms the intake end of the depending pipe 20. The upper level of the water on the roof 12 is limited by means of an overflow pipe 61. The pipe 62 extending forwardly from the roof and having the valve 63 thereon provides a vapor vent for the release of vapors from the tank and the smaller upstanding pipe 64 is provided so that sediment which accumulates in the bottom of the tank can be gauged from time to time.

During operation of the storage tank above described it will be understood that when the tank is filled with a volatile product water must be proportionally released from the tank which is provided for as follows: The gasoline or other volatile liquid is pumped into the tank through the pipe line 28, the valve 30 being opened for the purpose, whereupon the liquid will flow upwardly through the pipe section 32 and into the tank through the opening 36. The same will open since float 40 will be so positioned as to align with said opening 36 the opening 38 in the movable sleeve 37. Pumping of the volatile liquid should not be started until after the water outlet valve 25 is opened, whereupon water will flow from the tank through the outlet pipe 23. Should the rate of pumping fluctuate the same will be compensated for by a slight raising or lowering of the depending pipe 20, the lower end of which controls the extent of the opening to the outlet pipe 23 so that the flow of water from the tank will be increased or decreased. In the event the rate of gasoline delivery to the tank exceeds the maximum flow of water through pipe 23 the gasoline level in the float chamber 33 will rise, thus raising the float 40 and the movable sleeve 37 to thereby decrease the gasoline flow to the tank through the opening 36. The water outlet valve 25 should be closed just as soon as pumping in of the gasoline is finished.

To withdraw the volatile product from the tank it is only necessary to open valve 30 on pipe line 28 and allow the product to flow from the tank. When this takes place the roof will gradually descend and water will flow over the weir 17 into the depending pipe 20 from which it is discharged into the bottom portion of the tank. This continues until the roof returns to its normal position. Automatically with the flow of the water from the roof over the weir 17 the float member 59 will actuate valve 60 and allow water to flow onto the roof to replenish the supply. If the gasoline should be withdrawn from the tank at a faster rater than water can be admitted it will be seen that the gasoline level in chamber 33 will fall and with it the float 40 and sleeve 37. This will close opening 36 and prevent further withdrawal from the tank until the deficiency in the volume of the liquid within the tank is made up by flow of water from the roof. The flow of gasoline or other volatile liquid from the tank therefore takes place at a rate substantially equal to the flow of water into the tank.

It will be observed that the chamber 33 extends upwardly from the roof and that the volatile liquid is drawn off at a point above the horizontal line formed by the roof when in normal position. As a result of this structure it is possible to wash the tank and to float foreign particles and the like up through the manhole opening, whereupon they can be easily removed or can be automatically washed from the tank by overflowing this manhole opening for which purpose it is necessary to remove the cover 35. In the type of tank herein described the stored liquid is always in contact with the roof and since there is no vapor space in the tank evaporation of the stored liquid is completely eliminated. Moreover, a blanket of water is maintained on the roof to insulate the same against the heat of the sun and which therefore maintains the stored liquid at a considerably lower temperature than would otherwise be the case.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a storage tank for volatile liquids, means delivering to the bottom of the tank a liquid of higher specific gravity than the volatile liquid being stored, means automatically controlling the delivery of the liquid of higher specific gravity to the tank as the volatile liquid is withdrawn to maintain the tank completely filled and thus eliminate all vapor space, means for withdrawing the liquid of higher specific gravity when volatile liquid is introduced into the tank, an inlet and outlet member for the volatile liquid located in the upper portion of the tank, and float controlled valve means located on said member and operating to regulate the flow of volatile liquid into or from the tank in accordance with the level of the volatile liquid within the tank, said float controlled valve means having a fully opened position for maximum flow only when the volatile liquid within the tank is at a predetermined level.

2. In a storage tank for volatile liquids, means delivering to the bottom of the tank a liquid of higher specific gravity than the volatile liquid being stored, means automatically controlling the delivery of the liquid of higher specific gravity to the tank as the volatile liquid is withdrawn to maintain the tank completely filled and thus eliminate all vapor space, means for withdrawing the liquid of higher specific gravity when volatile liquid is introduced into the tank, an inlet and outlet member having an opening permitting flow of the volatile liquid into or from the tank, a sleeve mounted for movement on said member providing a control valve to regulate the flow through said opening, and a float attached to said sleeve, whereby said sleeve has movement to regulate the flow of the volatile liquid into or from the tank in accordance with the level of said volatile liquid in the tank.

3. In a storage tank for volatile liquids, means delivering to the bottom of the tank a liquid of higher specific gravity than the volatile liquid being stored, means automatically controlling the delivery of the liquid of higher specific gravity to the tank as the volatile liquid is withdrawn to maintain the tank completely filled and thus eliminate all vapor space, means for withdrawing the liquid of higher specific gravity when volatile liquid is introduced into the tank, an upstanding inlet and outlet pipe located in the upper portion of the tank, said pipe having an opening therein permitting flow of the volatile liquid into or from the tank, a movable sleeve on said upstanding pipe also having an opening and which aligns with the opening in the pipe when in predetermined vertical position, and a float attached to said movable sleeve to impart movement thereto in accordance with variations in the level of the volatile liquid in the tank.

4. In a storage tank for volatile liquids, comprising a receptacle, a diaphragm type of roof for the receptacle, means for delivering water to said roof, means for conducting the water from the roof to the bottom of the tank, an outlet for said water in the bottom of the tank, an inlet and outlet pipe for the volatile liquid in the upper portion of the tank, said pipe having an opening therein on a horizontal plane substantially coinciding with the periphery of the roof of the tank and through which flow of the volatile liquid takes place in entering or leaving the tank, and float means constructed and arranged to close said opening when the level of the volatile liquid within the tank is at a predetermined distance above or below the said horizontal plane.

5. In a storage tank for volatile liquids, comprising a receptacle, a diaphragm type of roof for the receptacle, means for delivering water to said roof, means for conducting the water from the roof to the bottom of the tank, an outlet for said water in the bottom of the tank, an inlet and outlet pipe for the volatile liquid in the upper portion of the tank, said pipe having an opening therein on a horizontal plane substantially coinciding with the periphery of the roof of the tank and through which flow of the volatile liquid takes place in entering or leaving the tank, a sleeve member on said pipe capable of movement longitudinally thereof for closing said opening, and a float attached to said sleeve member whereby the same has movement to control the flow of volatile liquid into and from the tank through said opening in accordance with the level of the volatile liquid within the tank.

CLIFFORD A. ELLIS.